US008819274B2

(12) United States Patent
Rodriguez et al.

(10) Patent No.: US 8,819,274 B2
(45) Date of Patent: Aug. 26, 2014

(54) SELECTING A NETWORK CONNECTION FOR DATA COMMUNICATIONS WITH A NETWORKED DEVICE

(75) Inventors: Adrian X. Rodriguez, Durham, NC (US); Carlos Santana, Durham, NC (US); Ketan K. Shah, Cary, NC (US); Jared T. Siirila, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 13/169,854

(22) Filed: Jun. 27, 2011

(65) Prior Publication Data

US 2012/0331130 A1  Dec. 27, 2012

(51) Int. Cl.
*G06F 15/173* (2006.01)

(52) U.S. Cl.
USPC .......................................................... 709/238

(58) Field of Classification Search
CPC .............. H04L 43/0823; H04L 67/101; H04L 67/1021
USPC ................................................ 709/224, 238
See application file for complete search history.

(56) References Cited

U.S. PATENT DOCUMENTS

| 6,466,802 | B1 | 10/2002 | Blakeney, II et al. |
| 6,996,132 | B1* | 2/2006 | Tolety ............................ 370/517 |
| 7,433,929 | B2 | 10/2008 | Guilford et al. |
| 7,826,844 | B2 | 11/2010 | Cooper |
| 7,835,743 | B2 | 11/2010 | Zhang et al. |
| 2002/0133598 | A1 | 9/2002 | Strahm et al. |
| 2004/0236547 | A1 | 11/2004 | Rappaport et al. |
| 2005/0005038 | A1* | 1/2005 | Ayukawa et al. ................ 710/38 |
| 2006/0075136 | A1* | 4/2006 | Iwata ............................. 709/238 |
| 2006/0268711 | A1 | 11/2006 | Doradla et al. |
| 2007/0010278 | A1 | 1/2007 | D'Agostino et al. |
| 2009/0275340 | A1* | 11/2009 | Axelsson et al. ............. 455/450 |
| 2010/0008291 | A1 | 1/2010 | Leblanc et al. |
| 2010/0316155 | A1 | 12/2010 | Reinhold |
| 2011/0038254 | A1* | 2/2011 | Hashiguchi et al. .......... 370/217 |
| 2011/0063971 | A1* | 3/2011 | Tochio .......................... 370/224 |
| 2011/0072378 | A1 | 3/2011 | Nurminen et al. |
| 2012/0058782 | A1* | 3/2012 | Li .............................. 455/456.2 |
| 2012/0077488 | A1* | 3/2012 | Unger et al. ............... 455/432.1 |
| 2012/0244869 | A1 | 9/2012 | Song et al. |
| 2012/0331130 | A1 | 12/2012 | Rodriguez et al. |
| 2012/0331157 | A1 | 12/2012 | Rodriguez et al. |

OTHER PUBLICATIONS

Carstens, "Wireless Access Network Selection in Heterogeneous Network for Multimode Terminals", IP.com No. IPCOM000143216D, Siemens AG, Dec. 10, 2006.
Arkko et al., "Network Discovery and Selection Problem (RFC5113)", IP.com No. IPCOM000166865D, Internet Society Requests For Comment (RFCs), Jan. 1, 2008.

(Continued)

*Primary Examiner* — Jason Recek
(74) *Attorney, Agent, or Firm* — Edward J. Lenart; Katherine S. Brown; Biggers Kennedy Lenart Spraggins LLP

(57) ABSTRACT

Selecting a network connection for data communications with a networked device, including: identifying a plurality of networks available for data communications with the networked device, each network having network connection attributes; and selecting one of the plurality of networks in dependence upon the network connection attributes and the direction of data transfer.

12 Claims, 3 Drawing Sheets

(56) References Cited

OTHER PUBLICATIONS

Yang et al., "An energy-efficient handover scheme with geographic mobility awareness in WiMAX-WiFi integrated networks", Wireless Communications and Networking Conference, 2009. WCNC 2009. IEEE, Publication Year: 2009, pp. 1-6.

Cavalcanti et al., "Impact of Intelligent Access Selection Algorithms in Cooperative Wireless Networks", 2006 International Telecommunications Symposium, ITS, Jan. 1, 2006, http://www.decom.fee.unicamp.br/~fabiano/index_arquivos/ITS2006_271.pdf.

"Using droid wifi—Android Forums," http://android.bigresource.com/Track/android-x1yGSZQ0B/, accessed Feb. 21, 2011, 5 pages.

* cited by examiner

US 8,819,274 B2

SELECTING A NETWORK CONNECTION FOR DATA COMMUNICATIONS WITH A NETWORKED DEVICE

BACKGROUND OF THE INVENTION

1. Field of the Invention

The field of the invention is data processing, or, more specifically, methods, apparatus, and products for selecting a network connection for data communications with a networked device.

2. Description of Related Art

Modern computing devices are frequently capable of connecting to a plurality of available data communications networks, each of which may offer differing levels of service. For example, some networks may offer faster connection speeds than other networks. Likewise, some networks may require different communications hardware from a device that attempts to connect to the network. Because the service level offered by each available network may change as more users use a network, as network hardware changes, and so on, it may be difficult to know the precise level of service offered by each available network. Furthermore, because modern computing devices are often mobile, the precise level of service offered by each available network may change as a computing device moves to different locations.

SUMMARY OF THE INVENTION

Selecting a network connection for data communications with a networked device, including: identifying a plurality of networks available for data communications with the networked device, each network having network connection attributes; and selecting one of the plurality of networks in dependence upon the network connection attributes and the direction of data transfer.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
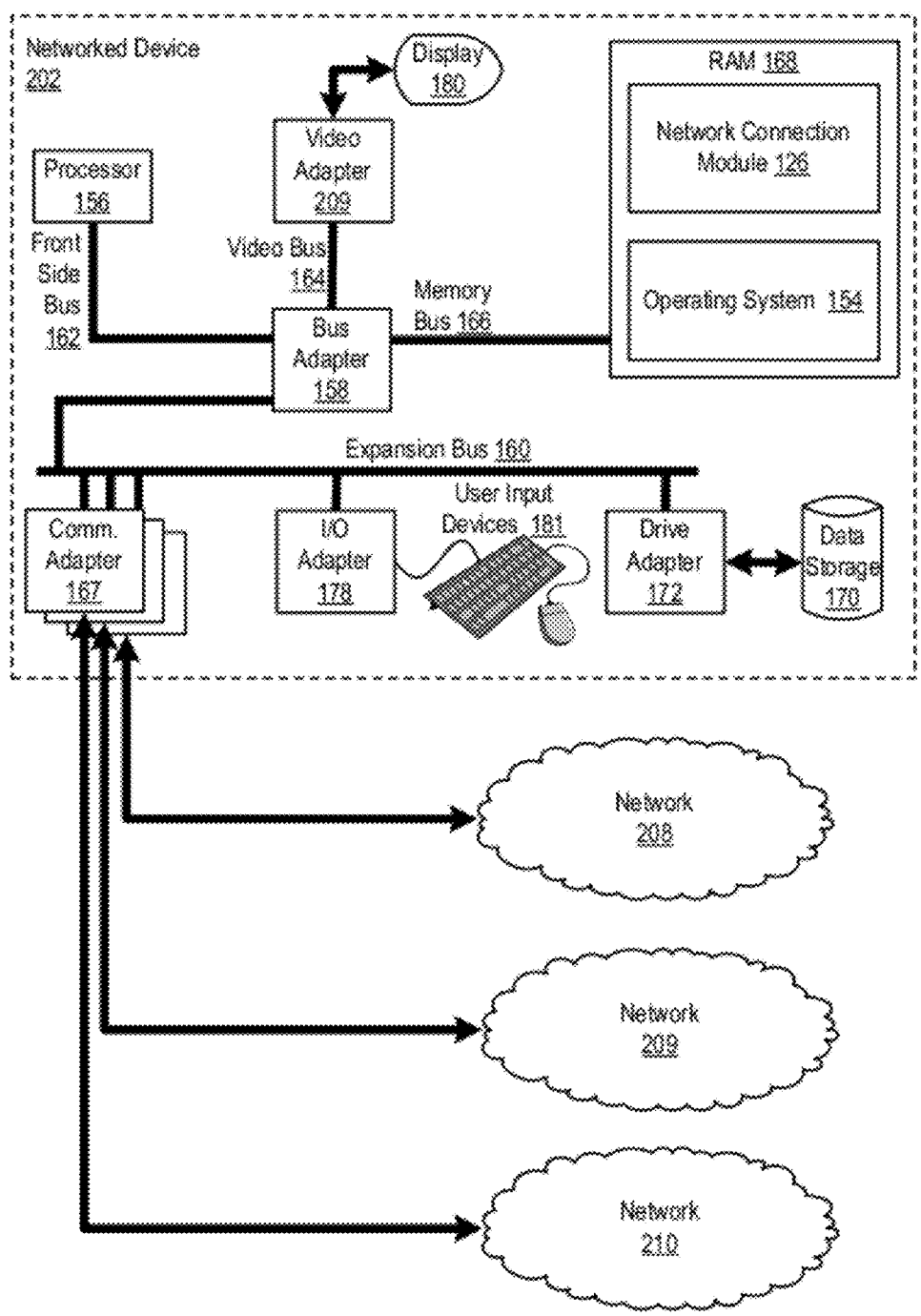
FIG. 1 sets forth a block diagram of automated computing machinery comprising an exemplary networked device useful in selecting a network connection for data communications according to embodiments of the present invention.

Exemplary methods, apparatus, and products for selecting a network connection for data communications with a networked device in accordance with the present invention are described with reference to the accompanying drawings, beginning with FIG. 1. Selecting a network connection for data communications with a networked device in accordance with the present invention is generally implemented with computers, that is, with automated computing machinery. FIG. 1 sets forth a block diagram of automated computing machinery comprising an exemplary networked device (202) useful in selecting a network connection for data communications according to embodiments of the present invention. The networked device (202) of FIG. 1 includes at least one computer processor (156) or 'CPU' as well as random access memory (168) ('RAM') which is connected through a high speed memory bus (166) and bus adapter (158) to processor (156) and to other components of the networked device (202).

Stored in RAM (168) is a network connection module (126), a module of computer program instructions for selecting a network connection for data communications according to embodiments of the present invention. The network connection module (126) can select a network connection for data communications by identifying a plurality of networks (208, 209, 210) available for data communications with the networked device (202). In the example of FIG. 1, each network (208, 209, 210) has network connection attributes. Network connection attributes can include, for example, upload attributes and download attributes. In the example of FIG. 1, a particular network is selected by the networked device in dependence upon the network connection attributes and the direction of data transfer.

Also stored in RAM (168) is an operating system (154). Operating systems useful selecting a network connection for data communications with a networked device (202) according to embodiments of the present invention include UNIX™, Linux™, Microsoft XP™, AIX™, IBM's i5/OS™ Android OS™ iPhone OS™ and others as will occur to those of skill in the art. The operating system (154) and network connection module (126) in the example of FIG. 1 are shown in RAM (168), but many components of such software typically are stored in non-volatile memory also, such as, for example, on a disk drive (170).

The networked device (202) of FIG. 1 includes disk drive adapter (172) coupled through expansion bus (160) and bus adapter (158) to processor (156) and other components of the networked device (202). Disk drive adapter (172) connects non-volatile data storage to the networked device (202) in the form of disk drive (170). Disk drive adapters useful in computers for selecting a network connection for data communications with a networked device (202) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example networked device (202) of FIG. 1 includes one or more input/output ('I/O') adapters (178). I/O adapters implement user-oriented input/output through, for example, software drivers and computer hardware for controlling output to display devices such as computer display screens, touch screens, as well as user input from user input devices (181) such as keyboards, mice, keypads, and touch screens. The example networked device (202) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary networked device (202) of FIG. 1 includes one or more communications adapters (167) for data communications through one or more data communications networks (208, 209, 210). Such data communications may be carried out serially through RS-232 connections, through external buses such as a Universal Serial Bus ('USB'), through data communications networks such as IP data communications networks, through telecommunications networks, and in other ways as will occur to those of skill in the art. Communications adapters implement the hardware level of data communications through which one computer sends data communications to another computer, directly or through a data communications network. Examples of communications adapters useful for selecting a network connection for data communications with a networked device (202) according to embodiments of the present invention include modems for wired dial-up communications, Ethernet (IEEE 802.3) adapters for wired data communications network communications, and 802.11 adapters for wireless data communications network communications.

Figure 2:
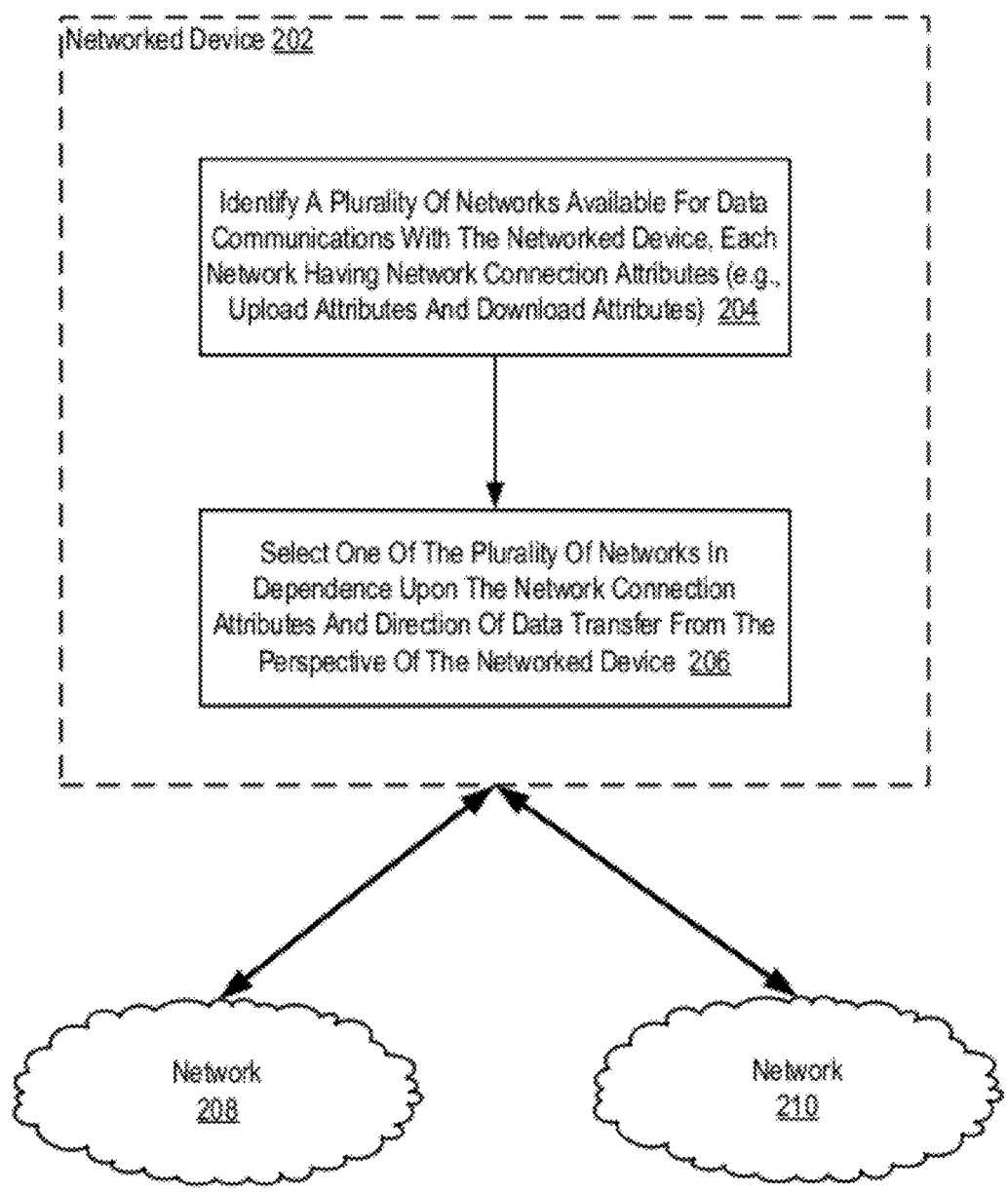
FIG. 2 sets forth a flow chart illustrating an exemplary method for selecting a network connection for data communications with a networked device according to embodiments of the present invention.

For further explanation, FIG. 2 sets forth a flow chart illustrating an exemplary method for selecting a network connection for data communications with a networked device according to embodiments of the present invention. The example method of FIG. 2 includes identifying (204) a plurality of networks (208, 210) available for data communications with the networked device (202). In the example of FIG. 2, identifying (204) a plurality of networks (208, 210) that are available for data communications with the networked device (202) may be carried out using the network discovery capabilities of the networked device (202). For example, the networked device (202) may include a wireless network adapter capable of identifying all data communications networks that the networked device (202) can communicate with using its wireless network adapter, a wired network adapter capable of identifying all data communications networks that the networked device (202) can communicate with using its wired network adapter, a mobile telecommunications adapter capable of identifying all mobile telecommunications networks that the networked device (202) can communicate with using its wired network adapter, and so on.

In the example of FIG. 2, each network (208, 210) has network connection attributes such as, for example, upload attributes and download attributes that are associated with each network (208, 210). The upload attributes can include the rate at which data is uploaded from the networked device (202) to the network (208, 210), the rate at which power is consumed by the networked device (202) when data is uploaded from the networked device (202) to the network (208, 210), the rate at which upload operations from the networked device (202) to the network (208, 210) fail, and other upload attributes as will occur to those of skill in the art. The download attributes can include, for example, the rate at which data is downloaded from the network (208, 210) to the networked device (202), the rate at which power is consumed by the networked device (202) when data is downloaded from the network (208, 210) to the networked device (202), the rate at which download operations from the network (208, 210) to the networked device (202) fail, and other download attributes as will occur to those of skill in the art. The upload attributes and download attributes may also include an indication of the type of the network. For example, an the upload attributes and the download attributes for a particular network may include an indication that the particular network is a telecommunications network, which may be a valuable piece of information so as to avoid selecting the telecommunications network for large upload operations or download operations that may exceed data usage limits and generate additional charges for the user of the networked device (202).

The example of FIG. 2 also includes selecting (206) one of the plurality of networks (208, 210) in dependence upon the network connection attributes and the direction of data transfer. In the example of FIG. 2, the direction of data transfer is measured from the perspective of the networked device (202). In the example of FIG. 2, the direction of data transfer can be a download or an upload. A download, as the term in used here, represents a data transfer from a network (208, 210) to the networked device (202) that is frequently initiated by the networked device (202). An upload, as the term in used here, represents a data transfer from the networked device (202) to a network (208, 210). Although such data transfers may included bidirectional data transfers, for the purposes of handshaking, verifying the success or a data transfer, and so on, the terms upload and download are used according to their standard meaning as would be understood by one of skill in the art.

In the example of FIG. 2, selecting (206) one of the plurality of networks (208, 210) in dependence upon the network connection attributes and the direction of data transfer may be carried out, for example, by determining whether a particular data transfer will be an upload or a download from the perspective of the networked device (202). If the particular data transfer is an upload, the upload attributes may be more heavily weighted such that the network (208, 210) with the most desirable upload attributes is selected. If the particular data transfer is a download, the download attributes may be more heavily weighted such that the network (208, 210) with the most desirable download attributes is selected. In the example of FIG. 2, therefore, the networked device (202) connects to networks not necessarily based on signal strength but rather on performance related attributes associated with a network. As such, the networked device (202) may connect to a faster network whose signal strength is weaker than a slower network with excellent signal strength.

Figure 3:
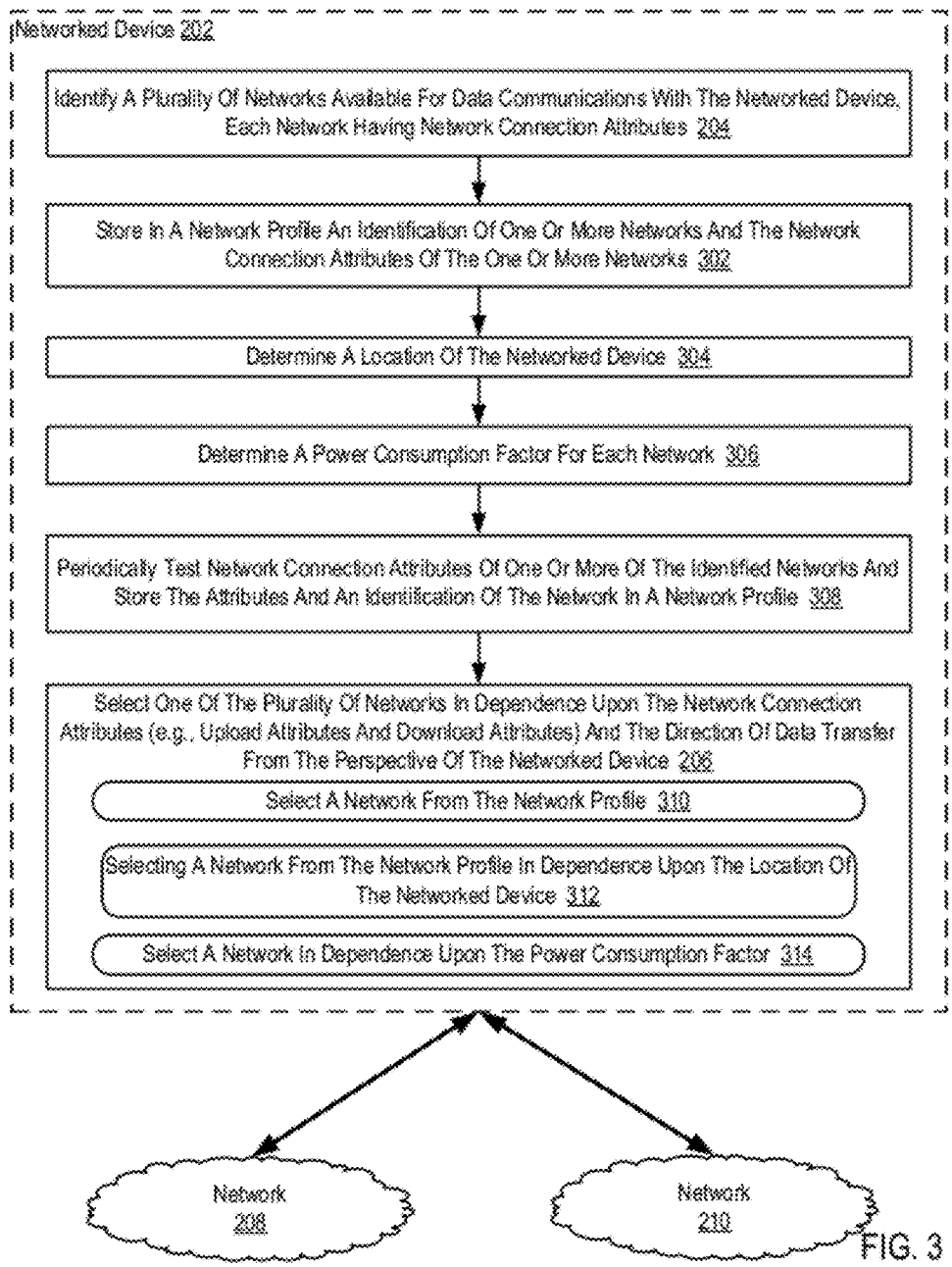
FIG. 3 sets forth a flow chart illustrating an exemplary method for selecting a network connection for data communications with a networked device according to embodiments of the present invention.

For further explanation, FIG. 3 sets forth a flow chart illustrating an exemplary method for selecting a network connection for data communications with a networked device (202) according to embodiments of the present invention. The example method of FIG. 3 is similar to the example method FIG. 2 as it also includes identifying (204) a plurality of networks (208, 210) available for data communications with the networked device (202) and selecting (206) one of the plurality of networks (208, 210) in dependence upon the network connection attributes and the direction of data transfer.

The example method of FIG. 3 includes storing (302) in a network profile an identification of one or more networks and the network connection attributes of the one or more networks. In the example method of FIG. 3, the network profile may be stored in computer memory of the networked device (202). The network profile of FIG. 3 may be embodied as a data structure that associates various attributes with the network (208, 210) that the attributes are associated with. Table 1 sets forth an example of network profile that may be stored (302) in computer memory of the networked device (202):

TABLE 1

Network Profile

| Network Name | Network Type | Upload Speed | Download Speed |
|---|---|---|---|
| ATT3G | Cellular Network | 22 Mbits/s | 56 Mbits/sec |
| WIFI1 | Wireless LAN | 150 Mbits/s | 500 Mbits/s |

TABLE 1-continued

Network Profile

| Network Name | Network Type | Upload Speed | Download Speed |
|---|---|---|---|
| WIFI2 | Wireless LAN | 300 Mbits/s | 950 Mbits/s |
| SPRINT4G | Cellular Network | 100 Mbits/s | 300 Mbits/s |
| PRIVATEWE1 | Wired LAN | 850 Mbits/s | 2.5 Gbits/s |
| WIREDETH1 | Wired LAN | 400 Mbits/s | 400 Mbits/s |

The example network profile illustrated in Table 1 includes entries for six networks. Each entry has a field for the name of the network, a field describing the type of the network, an entry for an upload attribute that includes an upload speed for the network, and an entry for a download attribute that includes a download speed for the network. The example depicted in Table 1 is just one example of a network profile. Network profiles may be embodied in many other data structures and may include many other fields describing other upload attributes, download attributes, power consumption attributes, and other information as will occur to those of skill in the art.

The example method of FIG. 3 also includes determining (304) a location of the networked device (202). In the example of FIG. 3, determining (304) a location of the networked device (202) may be carried out, for example, using global positioning system ('GPS') technology embedded within the networked device (202). Determining (304) a location of the networked device (202) may also be carried out by prompting a user of the networked device (202) to select from amongst a collection of known locations such as, for example, 'home,' 'office,' 'the gym,' and other stored locations at which the user has previously identified available networks.

In the example of FIG. 3, selecting (206) one of the plurality of networks (208, 210) in dependence upon the network connection attributes and the direction of data transfer further comprises selecting (312) a network (208, 210) in dependence upon the location of the networked device (202). In the example of FIG. 3, the network connection attributes that are associated with a particular set of networks that are available at a particular location may be such that a preferred network exists for upload data transfers and download data transfers at the particular location.

The example method of FIG. 3 also includes periodically (308) testing network connection attributes of one or more of the identified networks (208, 210) and storing the attributes and an identification of the network (208, 210) in a network profile. In the example of FIG. 3, periodically (308) testing network connection attributes of one or more of the identified networks (208, 210) may be carried out by executing testing operations at a predetermined interval. The predetermined interval may be set by a user of the networked device (202) or included as a default device configuration parameter for the networked device (202). Alternatively, the user of the networked device may execute testing operations upon user command.

In the example of FIG. 3, selecting (206) a network connection for data communications with a networked device (202) can include selecting (310) a network from the network profile. Selecting (310) a network from the network profile may be carried out, for example, by searching the network profile for the available network with the highest upload speed available when upload operations are occurring, searching the network profile for the available network with the highest download speed available when download operations are occurring, and so on.

The example of FIG. 3 includes determining (306) a power consumption factor for each network. In the example of FIG. 3, the power consumption factor may correspond to the amount of power that is used by the networked device (202) to carry out data transfer operations in accordance with the network connection attributes associated with a particular network. For example, if a first network has an upload attribute indicating that upload operations can occur at 1 Mb/sec and a second network has an upload attribute indicating that upload operations can occur at 2 Mb/sec, a power profile can be constructed that specifies the amount of power that the networked device (202) uses to upload data at a rate of 1 Mb/sec and the amount of power that the networked device (202) uses to upload data at a rate of 2 Mb/sec.

In the example of FIG. 3, selecting (206) a network connection for data communications with a networked device (202) can include selecting (314) a network (208, 210) in dependence upon the power consumption factor. In the example of FIG. 3, the power consumption factor may be accounted for as another parameter to be used when determining with network connection to select (206). Consider the example described above in which a first network has an upload attribute indicating that upload operations can occur at 1 Mb/sec and a second network has an upload attribute indicating that upload operations can occur at 2 Mb/sec. In such an example, if it is determined that the amount of power that the networked device (202) uses to upload data at a rate of 2 Mb/sec is ten times greater than the amount of power that the networked device (202) uses to upload data at a rate of 1 Mb/sec, the networked device (202) may select (206) the first network in spite of the fact that the upload rate is less than as is offered by the second network. Alternatively, the power consumption factor may only be taken into account when battery life drops below a predetermined threshold, such that a fully charged networked device (202), or a networked device (202) that is connected to a power supply, may always select the network connection that offers the best data transfer rate.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for selecting a network connection for data communications with a networked device, the apparatus comprising a computer processor, a computer memory operatively coupled to the computer processor, the computer memory having disposed within it computer program instructions that, when executed by the computer processor, carry out the steps of:

identifying a plurality of networks available for data communications with the networked device, each network having network connection attributes, wherein the network connection attributes include at least a power consumption upload rate, a power consumption download rate, upload fail rate, and a download fail rate; and determining a location of the networked device including prompting a user of the networked device to select the location from amongst a collection of known locations;

selecting one of the plurality of networks in dependence upon the network connection attributes and the direction of data transfer from the perspective of the networked device, wherein selecting one of the plurality of networks in dependence upon the network connection attributes and the direction of data transfer further comprises selecting a network in dependence upon the location of the networked device.

2. The apparatus of claim 1 wherein the network connection attributes include upload attributes, download attributes, or any combination thereof.

3. The apparatus of claim 1 further comprising computer program instructions that, when executed by the computer processor, carry out the step of storing in a network profile an identification of one or more networks and the network connection attributes of the one or more networks, wherein selecting a network connection for data communications with a networked device further comprises selecting a network from the network profile.

4. The apparatus of claim 1 further comprising computer program instructions that, when executed by the computer processor, carry out the steps of periodically testing network connection attributes of one or more of the identified networks and storing the attributes and an identification of the network in a network profile.

5. The apparatus of claim 1 further comprising computer program instructions that, when executed by the computer processor, carry out the step of:
   determining a power consumption factor for each network, wherein selecting one of the plurality of networks in dependence upon the network connection attributes and the direction of data transfer further comprises selecting a network in dependence upon the power consumption factor.

6. The apparatus of claim 2 wherein the upload attributes include an upload speed and wherein the download attributes include a download speed.

7. A computer program product for selecting a network connection for data communications with a networked device, the computer program product disposed upon a computer readable storage medium, wherein the computer readable storage medium is not a signal, the computer program product comprising computer program instructions that, when executed, cause a computer to carry out the steps of:
   identifying a plurality of networks available for data communications with the networked device, each network having network connection attributes, wherein the network connection attributes include at least a power consumption upload rate, a power consumption download rate, upload fail rate, and a download fail rate; and
   determining a location of the networked device including prompting a user of the networked device to select the location from amongst a collection of known locations;
   selecting one of the plurality of networks in dependence upon the network connection attributes and the direction of data transfer from the perspective of the networked device, wherein selecting one of the plurality of networks in dependence upon the network connection attributes and the direction of data transfer further comprises selecting a network in dependence upon the location of the networked device.

8. The computer program product of claim 7 wherein the network connection attributes include upload attributes, download attributes, or any combination thereof.

9. The computer program product of claim 7 further comprising computer program instructions that, when executed, cause a computer to carry out the step of:
   storing in a network profile an identification of one or more networks and the network connection attributes of the one or more networks, wherein selecting a network connection for data communications with a networked device further comprises selecting a network from the network profile.

10. The computer program product of claim 7 further comprising computer program instructions that, when executed, cause a computer to carry out the steps of periodically testing the network connection attributes of one or more of the identified networks and storing the network connection attributes and an identification of the network in a network profile.

11. The computer program product of claim 7 further comprising computer program instructions that, when executed, cause a computer to carry out the step of:
   determining a power consumption factor for each network, wherein selecting one of the plurality of networks in dependence upon the network connection attributes and the direction of data transfer further comprises selecting a network in dependence upon the power consumption factor.

12. The computer program product of claim 8 wherein the upload attributes include an upload speed and wherein the download attributes include a download speed.

* * * * *